United States Patent [19]
Arima et al.

[11] Patent Number: 5,179,954
[45] Date of Patent: Jan. 19, 1993

[54] ULTRASONIC INSPECTION AND IMAGING INSTRUMENT

[75] Inventors: Yukio Arima, Tsukuba; Hiroaki Yanagimoto, Ibaraki; Yuichi Kunitomo, Tsuchiura; Tetsuyoshi Tominaga, Ibaraki, all of Japan

[73] Assignee: Hitachi Construction Machinery Company, Ltd., Tokyo, Japan

[21] Appl. No.: 707,567

[22] Filed: May 30, 1991

[30] Foreign Application Priority Data

May 30, 1990 [JP] Japan .................................. 2-141016

[51] Int. Cl.[5] .............................................. A61B 8/00
[52] U.S. Cl. .......................... 128/660.07; 128/660.08; 73/621
[58] Field of Search ...................... 128/660.06–660.10; 73/618, 621, 625–626

[56] References Cited

U.S. PATENT DOCUMENTS

| | | | |
|---|---|---|---|
| 4,240,295 | 12/1980 | Uranishi | 128/680.08 X |
| 4,398,422 | 8/1983 | Haerten | 128/660.08 X |
| 4,932,414 | 6/1990 | Coleman et al. | 128/660.09 |

FOREIGN PATENT DOCUMENTS

| | | |
|---|---|---|
| 189137 | 7/1986 | European Pat. Off. . |
| 353633 | 2/1990 | European Pat. Off. . |

*Primary Examiner*—Francis Jaworski
*Attorney, Agent, or Firm*—Fay, Sharpe, Beall, Fagan, Minnich & McKee

[57] ABSTRACT

An ultrasonic inspection and imaging instrument scans an object under examination, the object having an inspection plane at a predetermined depth, in the direction slanted to the depth (slant scanning), in such a way as to cause rectilinear scanning as viewed from the plane. Measured data on a peak value corresponding to each measurement point obtained from the slant scanning are displayed in the form of a picture on the screen of a display relative to each measurement point. The image displayed on the picturee at that time is most clearly demonstrated, provided an image portion in the vicinity of a test portion corresponding to a test surface is brought into focus in the depth direction. An operator selects the image portion clearly indicated out of the picture displayed on the display, and inputs the position of the image thereon to an input unit, whereby an image processor bases the positional information about the display data thus fed and the relevant information indicating the positional relationship in the depth direction on obtaining the position of the probe in the depth direction when the measured value resulting from the image is collected. The image processor positions the probe there, so that the probe is automatically focused on the test surface.

17 Claims, 3 Drawing Sheets

ULTRASONIC INSPECTION AND IMAGING INSTRUMENT

BACKGROUND OF THE INVENTION

1. Technical Field

The present invention relates to ultrasonic inspection and imaging instruments and more particularly to an ultrasonic inspection and imaging instrument which permits any person who is inexperienced in ultrasonic thickness measurement to readily focus a focusing-type ultrasonic probe (hereinafter called 'probe') on a place at a predetermined depth where an inspection is made.

2. Related Art

An ultrasonic inspection and imaging instrument as one of the ultrasonic measuring instruments (including an ultrasonic searching and imaging instrument using a focusing-type probe) is capable of displaying the interior of an object in the form of a B- and a C-scope image. An imaging instrument of this sort necessitates being fed with various measurement conditions, including the acoustic characteristics of its probe, and the wave velocity at the current temperatures of a medium of an object under examination, to set the focused probe to the interior of the object at a desired depth in order to obtain a clear image.

Heretofore, the focusing operation has been performed by observing the waveform reflected from an object under examination (A-scope image) using an oscilloscope or the like; more specifically, it comprises the steps of first setting a measurement depth, a detection gate width and the like by reference to a waveform to be monitored, moving up and down the focusing-type probe with respect to the object under examination so that a target reflection echo is maximized (positioning the depth (in the Z-direction)), and adjusting the focus of the probe to the depth desired.

Another example of the ultrasonic inspection and imaging instrument is such that, provided that measurement conditions, including acoustic characteristic values such as the wave velocity of an object under examination, the underwater focal length of a probe, a measurement depth and a detection gate width, are fed to its image processor (control unit), the image processor operates on data to focus the probe automatically onto the measurement depth desired based on the result computed.

However, an operator responsible for operating such an instrument is required to have an exhaustive knowledge as to electronic measurement, including ultrasonic measuring techniques, the acoustic characteristics of an object under examination and the operation of an oscilloscope. In other words, operators other than those specializing in this field of measurement often meet difficulties in operating an ultrasonic inspection and imaging instrument of this sort.

Incidentally, various ultrasonic inspection and imaging instruments for non-destructive inspection are now in use. This signifies the fact that those other than measuring engineers are expected to operate not only an ultrasonic inspection and imaging instrument of this kind but also a newly contrived portable one. As a result, those unfamiliar with ultrasonic thickness measurement may increasingly have a chance to handle and utilize such an instrument. It is true in a general sense that the development of an easy-to-use ultrasonic inspection and imaging instrument has been craved.

The ultrasonic inspection and imaging instrument is normally equipped with a microprocessor and an image processor having memories so that various kinds of data on varieties of operations can be preset. It is consequently possible to preset data concerning certain operations in order to simplify a series of them. Notwithstanding, there practically arise difficulties in presetting data to simplify the series of operations, as it depends on the object under examination how to solve the focusing problems. Consequently, engineers who have a thorough understanding of the acoustic characteristics and material quality of an object under examination and the like are relied upon to perform such focusing operations. In so doing, the engineer involved has to display and observe the interior ultrasonic conditions of the object under examination using the A-, C-scope image or the like as occasion demands to take measurement conditions and the like into consideration. The situation above has made it difficult to solve the foregoing problems.

SUMMARY OF THE INVENTION

An ultrasonic inspection and imaging instrument according to the present invention is designed to scan an object under examination, the object having an inspection plane at a predetermined depth, in a direction slanted to the depth, in such a way as to cause rectilinear scanning as viewed from the plane. A gate is provided in a range including the focal position of a probe to obtain, as measured data corresponding to each measurement position, the peak value of an echo resulting from predetermined directional linear scanning, which is slanted in the depth direction of the object under examination (hereinafter called 'slant scanning').

Simultaneously with the acquisition of the peak value, moreover, the relation in position between the object under examination at each measurement position and the probe in the depth direction is set and held in a memory in accordance with, for instance, relevant information for determining the positional relation. Then the measured data at the peak value corresponding to each measurement point obtained from the slant scanning in the depth direction is displayed on the screen in the form of a picture relative to that measurement point.

The image shown on the picture becomes most clear at the time it is in focus in the vicinity of a test portion corresponding to a surface under examination in the depth direction. The operator is then supposed to select the image portion clearly indicated on the display out of the picture indicated on the display, and when the operator feeds the position on the picture via an input unit, the image processor positions the probe by obtaining the position of the probe in the depth direction at the time the measured value regarding the image is collected, in accordance with positional information and of the display data and the relevant information, focusing relative to the surface under examination is effected.

The ultrasonic image obtained by means of the focusing-type probe features that reflection echo at a position other than the focal position is weak and this is also the case with the reflection echo at the focal position far from a measurement object. Consequently, if there exists an object under examination at a specific depth, the object having a specific planar area wide enough to produce an echo, a focusing-type probe may be used for scanning the object under examination in the direction slanted to its depth direction to obtain a picture variable in the depth direction on the screen of the display. The picture thus obtained looks as if it were obtained by fluoroscopy in the depth direction, with only the portion in focus at the position as the test surface in the picture being clearly emphasized. As a result, the measurement position in the depth direction is made known by selecting the clear image portion and focusing is made possible by properly positioning the probe.

In this case, it is made a condition that there exists no great reflector portion in front and rear of the object under examination in the depth direction. In case there exists such a reflector portion, the slant scanning will have to be carried out in the slant depth direction within a range excluding that portion. The object under examination is to have a common depth anywhere on the scanning surface formed with a collection of focal points during the slant scanning.

Any operator who is unfamiliar with ultrasonic and electronic measuring techniques is allowed to discern and select the position of a clear picture, if viewing the picture with an image clearly shown at the position corresponding to the focusing position. Moreover, it is possible to identify the surface desired to be examined and observed simultaneously. Ultimately, the operator is allowed, if selecting and inputting the position of such a clear picture portion to make the ultrasonic inspection and imaging instrument operate, on receiving the positional information thus selected from the input unit, to determine the position of the image selected thereby in the depth direction to adjust the height of the probe to that position automatically.

Any person inexperienced in ultrasonic thickness measurement is simply able to bring an object under examination into focus merely by inputting the position of the clear image position out of the picture indicated on the display accordingly.

An object of the present invention is therefore to provide an ultrasonic inspection and imaging instrument which permits any person who is inexperienced in ultrasonic thickness measurement to readily effect focusing thereof.

Another object of the present invention is to provide an ultrasonic inspection and imaging instrument capable of effecting focusing thereof automatically merely by performing the operation of selecting any given image from a displayed picture.

Still another object of the present invention is to provide an ultrasonic inspection and imaging instrument capable of effecting focusing thereof merely by touching the screen of a display once.

DESCRIPTION OF THE PREFERRED EMBODIMENT

Figure 1:
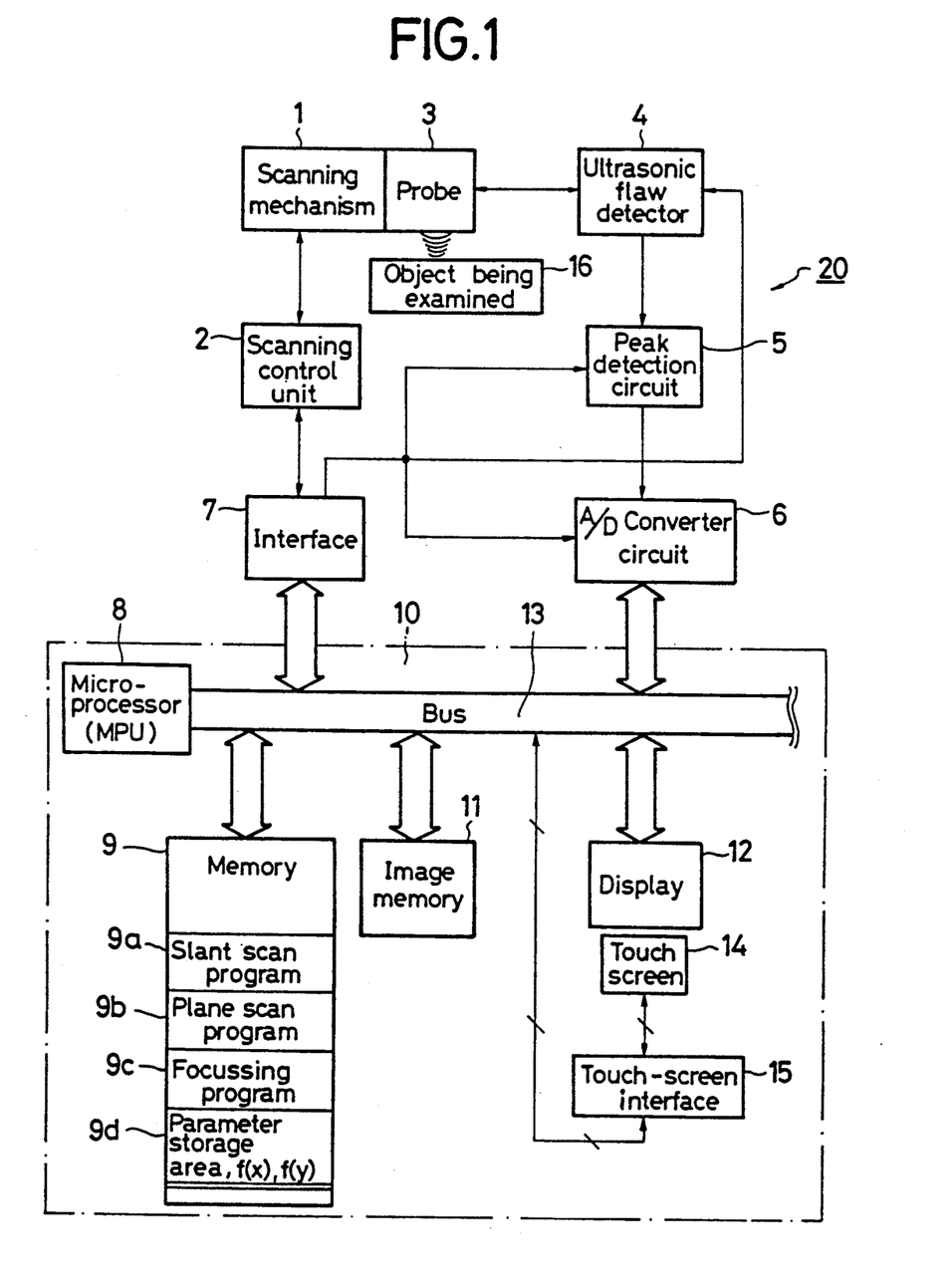
FIG. 1 is a block diagram of an ultrasonic inspection and imaging instrument embodying the present invention.

FIG. 1 shows an ultrasonic inspection and imaging instrument 20 and a scanning mechanism 1 having an XYZ moving mechanism. A focussed probe 3 is fitted to the scanning mechanism 1 and used for the main scanning of an object 16 under examination in the X-direction and for the subscanning of that object in the Y-direction. The ultrasonic inspection and imaging instrument 20 obtains measured values from which an A-scope image at each measurement point is obtained by the XY scanning, based on which it produces display data on a B-scope image and display data on a C-scope image and displays the B- and the C-scope image. Incidentally, an interface such as a junction face to be inspected exists in a position at a certain depth from the surface of the object 16 under examination in this embodiment.

The scanning mechanism 1 is controlled by a scanning control unit 2, which is in turn controlled by an image processor 10 via an interface 7. The probe 3 is connected to an ultrasonic flaw detector 4 consisting of a pulser receiver and the like. The ultrasonic flaw detector 4 applies a pulse signal from its transmission terminal to the probe 3 with a predetermined measurement period in response to a control signal from the image processor 10 to drive the probe 3. The probe 3 converts into an electrical signal the echo obtained from the object 16 under examination with respect to the ultrasonic examination wave, and the electrical signal thus converted is received as an echo reception signal by the reception terminal of the ultrasonic flaw detector 4 from the probe 3. The electrical signal is then amplified before being detected and the signal thus obtained is applied to a peak detection circuit 5.

The peak detection circuit 5 provides a gate in position using the echo reception signal thus detected to detect a peak value of the echo portion required, and supplies the peak value to an A/D converter circuit 6. The gate positioning depends on the set signal received from the image processor 10 via the interface 7. The peak detection circuit 5 sets the gate by detecting, for instance, a surface echo, and by performing time counting in accordance with the set signal.

The A/D converter circuit 6 converts the analog signal of the peak value obtained in accordance with the control signal from the image processor 10 into a digital value at 8-bit 256 stages, for instance. The digital value is sent to a bus 13 as input data made processable by a microprocessor (MPU) 8.

With the arrangement described above, the ultrasonic inspection and imaging instrument 20 operates in a normal measurement condition in such a way that the probe 3, for instance, moves by one pitch in the Y-direction after scanning one line in the X-direction to effect scanning in the direction opposite to the X-direction, i.e., the probe 3 scans the object 16 under examination in the XY plane by effecting so-called reciprocating scanning in the X-direction. The peak value is thus detected in the peak detection circuit 5 at each measurement point allotted at a predetermined pitch, and the MPU 8 fetches the peak value in the form of a digital value. The MPU 8 stores data on these peak values at the measurement points corresponding thereto in a memory 9 in sequence.

In the case of focusing measurement as described later, moreover, scanning in the Z-direction is added in conformity with the scanning of one line in the X- or Y-direction at the time of scanning the XY plane to effect slant scanning; i.e., the scanning slanted in the depth direction (Z-direction). A specific example of the slant scanning will be described later. When the MPU 8 stores the measured data in the memory 9, the measured data at the respective measurement points obtained in conformity with identification data can be stored by providing the memory 9 with areas in which the identification data at the respective measurement points corresponding thereto are stored.

In addition to the microprocessor 8, a control panel (not shown), the memory 9 for storing various programs and data, an image memory 11, a display 12 and the like are connected to the bus 13. A touch-sensitive screen 14 is fitted to the display 12 and connected via a touch-sensitive screen interface 15 to the bus 13. The touch-sensitive position is read in the MPU 8 through an interruption process. The touch-sensitive screen 14 is an input unit as one of the specific examples according to the present invention and used for providing positional information about a graphic display portion on the screen.

The memory 9 is stored with a slant scanning program 9a, a planar scanning program 9b, a focusing program 9c, a display processing program and the like. Slant scanning functions $Zs = f(x)$, $Zs = f(y)$ and the like are stored in a parameter storage area 9d.

The slant scanning program 9a is used to set the initial position of the probe unless it is specified. When this program is executed, the MPU 8 computes the Z-coordinate position (height) of the probe 3 to position the probe 3 so that the focal point is located directly under the surface of the object 16 under examination at the start point of measurement in conformity with the positional relation between the focal length of the probe 3 and the object 16 under examination, the positional relation being input to the MPU 8 beforehand via the control panel (normally the thickness of the object 16 under examination that the control panel has provided determines the positional relation as the object 16 under examination is arranged in the bottom of a water tank). Although the probe 3 is positioned in the Z-direction in accordance with its specified setting position the position previously defined is employed as a reference position (initial position) of slant scanning unless the setting position is specified.

Simultaneously with the start of measurement, the MPU 8 performs operations, starting with coordinate positions in the X-direction (or Y-direction) of the point of thickness measurement as the point thereof in the X-direction (or Y-direction) is updated according to the slant scanning function $Zs = f(x)$ (or $Zs = f(y)$) to compute the position Zs of the Z-coordinates. The MPU 8 further controls slant scanning in the Z-direction as well as the scanning in the X-direction (or Y-direction) on the basis of the computed movement of the Z-coordinates. The coordinates in the Z-direction on which the probe 3 is positioned are determined by the values computed by the slant scanning functions.

A description will next be given of a case where scanning is mainly effected in the depth direction simultaneously with the scanning in the X-direction. This is also the case with the scanning effected in the depth direction simultaneously with the scanning in the Y-direction; however, since there is substantially no difference between both cases except that the slant scanning function $Zs = f(y)$ is used instead, the description of this case will be omitted.

When the slant scanning function $f(x)$ is a primary function, the probe 3 moves in the Z-direction (height direction) with a predetermined pitch as the coordinates in the X-direction are updated. Consequently, the probe 3 normally approaches the object 16 under examination with the predetermined pitch as the scanning in the X-direction is effected. The object 16 under examination is thus scanned by the probe 3 on the plane slanted as viewed from its side. The slant scanning function $f(x)$ may be what is for performing compensating operations according to which the focal position of the probe 3 moves in the depth direction with a predetermined pitch within the object 16 under examination in connection with the relation between ultrasonic speed in the object 16 under examination and that in the water tank.

In the case of implementing focusing, however, the focal length of the probe 3 needs to be determined. The probe 3 has an intrinsic focal length having a known value at the time it is used. When it is attempted to gain a focal length fit for use in a particular environment, a simple gauge or a distance sensor which is mechanically interlocked with the probe may be employed. No special technical knowledge is required in this case. As focusing is based on the results of the slant scanning effected in the depth direction according to the present invention, the known focal length of the probe 3 determines an approximate focal position to be initially set during slant scanning even though a focal length fit for use in the particular environment is left unknown. This focusing operation is sufficient at this stage.

The planar scanning program 9b is an ordinary two-dimensional scanning program. The MPU 8 executes this program, and when the Z-coordinates (height) of the probe 3 are set accordingly, the MPU 8 causes main scanning in the X-direction with a predetermined pitch, and subscanning in the Y-direction with the height (Z-coordinates) fixed.

Incidentally, the measurement pitches in the X-and Y-directions are set at a preset distance in the slant scanning program 9a and the planar scanning program 9b. The measurement pitch in the Y-direction may be the same as, or coarser than, that in the X-direction. Moreover, the slant scanning program 9a also causes reciprocating scanning, like ordinary XY scanning in that scanning in the X-direction is effected in opposite directions moving the scanning position by one pitch in the Y-direction when one-line scanning in the X-direction is terminated. The return slant scanning in the X-direction is consequently arranged so that the probe 3 is positioned in the direction in which it goes away from the object under examination 16 at respective measurement points in sequence. In other words, the probe 3 returns to the reference position (initial position) of the first measurement point during the return scanning in the X-direction and scanning from the reference position is repeated.

In the case of the focusing program 9c, a measurement point nearest to the position of the X-coordinates on the picture of the display 12 designated by the touch-sensitive screen 14 is indexed (when the pixels of the picture displayed correspond to the measurement point at 1:1, the pixel is designated as conforming to the measurement position), and the Z-coordinates of the scanning of the probe 3 is obtained from the slant scanning function $f(x)$. The probe 3 is thus positioned.

The picture obtained from the slant scanning is a planar picture (called a slant picture herein) resulting from transmission in the depth direction in which the scanning of the probe 3 in the forward direction gradually becomes deeper. The distance between each pixel of the picture and the coordinate position of the Z-axis of the scanning mechanism (Z-coordinate values of the scanning), i.e., the measurement object 16 and the probe, corresponds in relation to the slant function $f(x)$. The Z-coordinates of the scanning can thus be obtained with ease. The calculation of the Z-coordinates need not always rely on the slant function $f(x)$ but may be performed by storing the position (height) of the Z- coordinate of the probe 3 in the memory 9 as measurement at each measurement point proceeds to make the measurement point and the height of the probe 3 correspond to each other. When the measurement point corresponds to the pixel, data on the height of the probe 3 may otherwise be stored in the memory in conformity with the picture indicated on the display 12.

Subsequently, the process of bringing the image processor into focus will be described with reference to FIG. 2.

Figure 2:
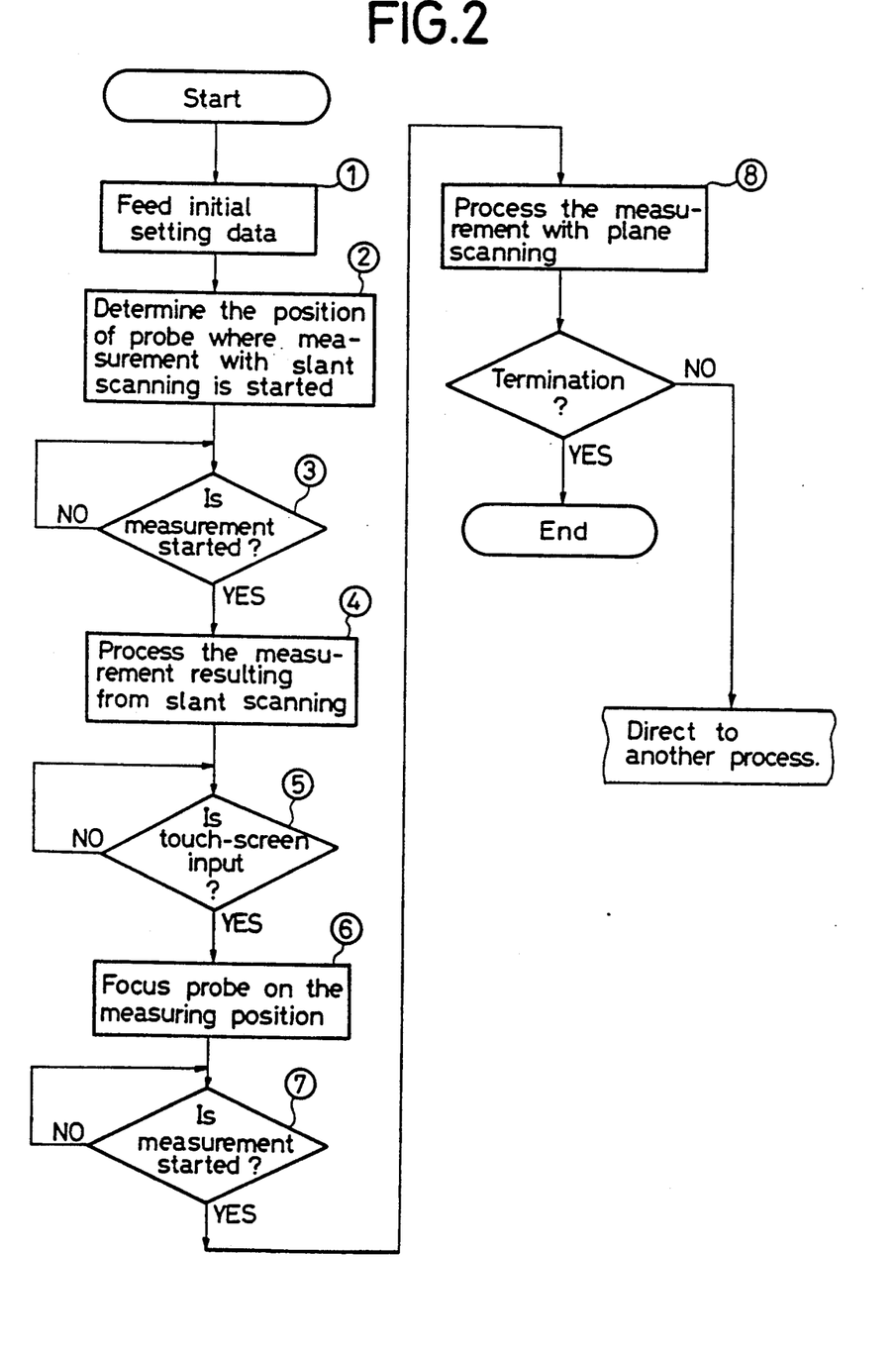
FIG. 2 is a flowchart showing a focusing process.

The processing of FIG. 2 is started when a predetermined focusing function key is pressed and initial data including the focal length of the probe 3 and the thickness of the measurement object 16 are keyboarded at the control panel 11 at Step 1. On the other hand, the set values most frequently used in the ultrasonic inspection and imaging instrument for the generation of a transmission pulse of the ultrasonic detector, and the gate width of the peak detection circuit and the like, are prestored in a predetermined area of the memory 9. In this case, the MPU 8 sets necessary data in various circuits via the interface 7 by reference to the set values stated above. The gate width of the peak detection circuit 5 is then set in the range of about 0.1 $\mu$s to several $\mu$s, for instance. Although these set values are variable, there will be no problem posed functionally in case they are left unchanged. In other words, setting alteration is unnecessary unless use can be made of knowledge about ultrasonic measurement.

The gate position is set in conformity with the focal position of the probe 3 and in terms of the time elapsed since the detection of a surface echo. The time required to set the gate is computed in such a way that where the slant scanning in the X-direction is involved, each measurement position of the Z-coordinates determined according to the slant function in proportion to the scanning distance in the X-direction is obtained to index the focal position of the probe 3 based thereon. A gate setting process program (not shown) for causing the operation like that to be performed is stored in the memory 9. The MPU 8 feeds the computed result via the interface 7 to the peak detection circuit 5 as the slant scanning proceeds. Provided the gate is set sufficiently wide, the gate position may be left invariable.

At Step 2, the slant scanning program 9a is activated and the probe 3 is situated at a measurement start position (initial position). More specifically, the MPU 8 executes the program to set the distance between the object under examination 16 and the probe 3 so that the focal point of the probe 3 as a reference position of the probe 3 in its height direction is located right under the surface thereof.

At Step 3, a loop waiting for a measurement start key on the control panel to be pressed is entered to see if the start of scanning is keyboarded. When the information thereabout is keyboarded, slant scanning measurement is started at Step 4 and the MPU 8 executes the slant scanning program 9a, whereby slant scanning is effected for the object under examination 16 with the measurement point (measurement position) being updated in the X-direction. As a result, one-line scanning in the X-direction is caused while the distance between the object under examination 16 and the probe 3 is gradually narrowed as the number of measurement points in the X-direction increases (the updated number of measurement points).

The scan is then moved by one pitch in the Y-direction where scanning is caused on the next line in the direction opposite to the previous scan directions. The distance between the object under examination 16 and the probe 3 gradually widens as the number of measurement points in the X-direction increases and the scanning on that next line in the X-direction is terminated.

The multicontrast data on the peak value obtained in conformity with each measurement point as the XY scanning of the slant scanning in the X-direction proceeds are stored as display data at the address of the image memory 11 corresponding XY-coordinates in accordance with the XY-coordinates of the present scanning position.

The display data stored in the image memory 11 are subsequently transferred to the video memory of the display 12 and its picture is displayed under the control of a controller contained in the display 12. The picture displayed at this time constitutes a test image resulting from the slant scanning in the depth direction and differs from the image measured on the surface of the object under examination or on the XY plane along a measurement object.

When measurement of one picture is completed after scanning is terminated, the MPU 8 activates the focusing program 9c at Step 5, which is a loop for waiting for the touching of the touch-sensitive screen 14. The picture presently displayed on the screen of the display 12 corresponds to the results of the scanning in the Z-direction simultaneously with the one-line scanning in the X-direction, and therefore the X-coordinates on the picture correspond to scanning coordinates in the Z-direction. In other words, the X-coordinates also correspond to the position in the depth direction, which is expressed therein. More specifically, the slant scanning in the depth direction (Z-direction) is caused in the X-direction as shown in FIG. 3(c) and an entry picture is displayed as a result of XY planar scanning.

Figure 3A:
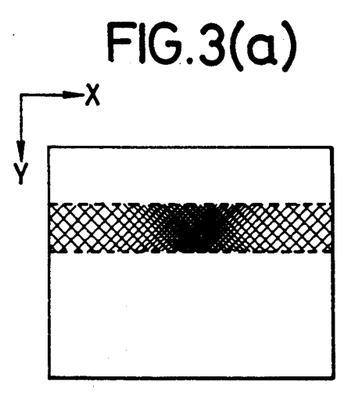
FIGS. 3(a), 3(b), 3(c), and 3(d) are diagrams illustrating the focusing process.
Figure 3B:
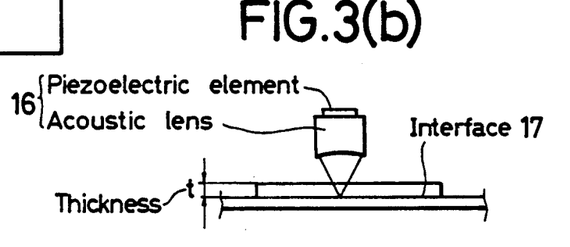
Figure 3C:
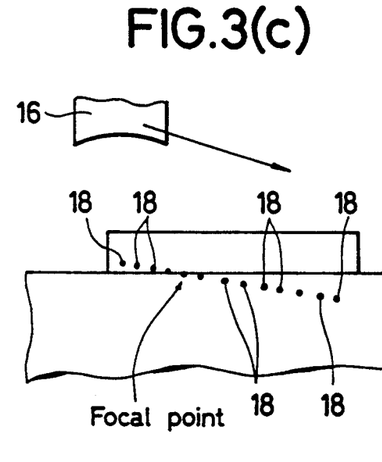

The image on the interface at the depth where the image has been brought into focus becomes clear and the other portion of the image in front and behind becomes blurred step by step as shown by a dotted line (and a mesh line) of FIG. 3(a). The reason for this is that, when the slant scanning shown in FIG. 3(c) is carried out on a junction face forming the surface inspected in the object under examination as shown in FIG. 3(b), the focal position 18 moves in the depth direction gradually and simultaneously with the update of each measurement point in the X-direction. Thus, only the image on the interface is clearly reflected at the time that to the junction face has been brought into focus.

Figure 3D:
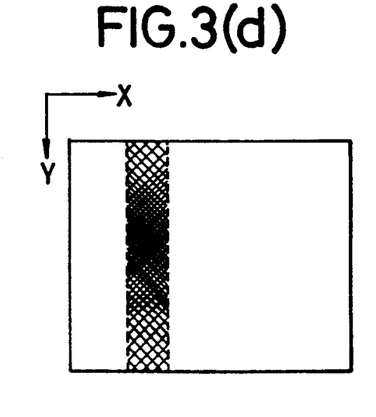

FIG. 3(d) illustrates a picture obtainable from the screen of the display 12 when the slant scanning in the depth direction is carried out in the X-direction with the slant scanning intended for the Y scan in place of the X scan. The scanning in the Y-direction in this case is such that the measurement position in the Y-direction is updated after the one-line scanning in the X-direction and the measurement position in the Z-direction is correspondingly updated.

When the operator subsequently touches the touch-sensitive screen 14 with reference to a clear display position on the picture at Step 5, Step 6 is followed and an interruption signal resulting from the touch thereby is fed via the interface 15 to the MPU 8.

Consequently, the MPU 8 performs the focusing process at Step 6. More specifically, on receiving the interruption signal, the MPU 8 indexes display coordinates at the position displayed on the display 12 from a positional signal on the touch-sensitive screen 14, extracts scanning X-coordinates, and computes scanning Z-coordinates from the measurement position thus extracted according to the slant function f(x) so as to place the probe 3 at that position. This position represents the height at which the probe 3 is brought into focus with respect to the junction face 17 intended for measurement.

At Step 7, the MPU 8 sees whether scanning is caused to start, using a loop waiting for a scanning measurement start key on the control panel to be pressed. When this key is pressed, the planar scanning program 9b is activated at Step 8 next and the MPU 8 causes planar scanning with the ordinary XY scanning starting from the measurement start position by means of the probe 3 fixed at the height where it has been brought into focus. The planar picture obtained from the planar scanning measurement provides a clear image focused onto the measurement depth desired.

It is therefore necessary for the operator to complete focusing only by touching the clearest spot of the picture obtained for focusing purposes (as things turn out, it is a planar image slanted to the XY plane) on the touch-sensitive screen 14. The MPU 8 obtains the position of the measurement point in the X-direction from the position coordinates in the X-direction of the pixel corresponding to the spot thus touched and then obtains the measurement position in the Z-direction from that in the X-direction according to the slant function $Zs=f(x)$ (or $Zs=f(y)$). In accordance with the coordinate value, MPU 8 controls the movement of the Z-axis of the scanning mechanism so that the gap between the probe 3 and the object under examination is set. Consequently, the ultrasonic inspection and imaging instrument can readily be brought into focus without particular technical knowledge about an ultrasonic wave, an electronic measuring instrument and the like.

As set forth above, the method of designating coordinates in focus in the embodiment shown employs a touch-sensitive screen. However, not only a touch-sensitive screen but also a mouse, a keyboard (e.g., its cursor keys) or the like may be used to input coordinates.

The slant functions in the embodiment are for determining the measurement position in the Z-direction as the depth direction in conformity with the scanning in either the X- or Y direction. The slant function is only one specific example of the relevant information for equating the position in the Z-direction of the measured value thus obtained with the display data on the picture generated from the measured value. In this case, any data are acceptable as long as the data represent relevant information, such that the position in the depth direction in which the corresponding measured data are indexed from the position of the image selected on the picture, and therefore the data need not represent a function. The measurement position coordinates, for instance, may be managed by a table of identification data which correspond to each measurement point.

Although the planar picture is gained by carrying out the two-dimensional scanning in the X-and the Y-directions, the picture resulting from the one-line scanning in the X-direction may be designated if it is clear. When only the one-line scanning is relied upon, the same effect may be attained by not only setting the probe close to the object under examination but also gradually setting it apart from their closest relationship.

The directions X, Y, Z are not absolute ones as they are determined relative to the object under examination. Particularly, the present invention is applicable to not only X, Y planar scanning but also R, θ rotary scanning. Moreover, X-, Y- and Z-coordinates are also determined by the movement of the table loaded with the object under examination relative to the probe. An adaptable scanning apparatus is therefore designed to fix the probe by moving any one of the tables involved in the X-, Y-and Z-directions. In addition, the scanning in the Z-direction may follow an electronic scanning method in which an array type probe is used for electronically setting the focal position in the depth direction so as to move the position. In brief, irrespective of the direction in which scanning is carried out, it is only necessary for scanning to be carried out in such a state that the respective measurement points are at least arranged rectilinearly and that slant scanning is simultaneously carried out in the depth direction of the object under examination.

Although the start position of the slant scanning is located right under the surface of the object under examination in the embodiment shown, the present invention is not limited to this arrangement but may start arranging to let the slant scanning start with any given depth. Although one point in the picture resulting from the slant scanning is designated and brought into focus according to the embodiment shown, data on the picture displayed during the slant scanning may be stored in the memory in order for the data to be called by means of the function key for redesignation, in that the positions in front and rear of focusing are used for focusing purposes. Focusing may thus be effected in sequence at a plurality of places in the depth direction of the interior of the object under examination. Further, the peak is not necessarily essential, though the peak value of an echo is detected in the embodiment shown. In this case, it may be arranged to detect an echo level, including the stress of an echo, so to speak.

We claim:

1. An ultrasonic inspection and imaging instrument for scanning an object under examination, said object having an interior test surface for detecting an echo level emanating from a position corresponding to a focal position obtained from said object under examination by means of a focusing-type probe and for making the echo level a measured value, and for generating display data according to said measured value in order to display a measurement picture of said test surface on the screen of a display, said instrument comprising:

scanning means for scanning said object under examination in a first direction along said test surface and in a second direction along the depth direction of said object under examination; and image processor means for carrying out, by controlling said scanning means, slant scanning in the second direction during the scanning in the first direction, for generating said display data according to the measured value obtained in order to display a measurement picture on the screen of said display, and for placing said probe at a position in the second direction where the measured value is collected with respect to an image portion in response to an input signal when the input signal is externally supplied, the input signal indicating that said image portion has been selected from said measurement picture.

2. Am ultrasonic inspection and imaging instrument as claimed in claim 1, further comprising input means for feeding, to said image processor means, an input signal for indicating that said image portion has been selected, said input means being connected to said image processor means.

3. An ultrasonic inspection and imaging instrument for scanning an object under examination, said object having an interior test surface for detecting an echo level emanating from a position corresponding to a focal position obtained from said object under examination by means of a focusing-type probe and for making the echo level a measured value, and for generating display data according to said measured value in order to display a measurement picture of said test surface on the screen of a display, said instrument comprising:

scanning means for scanning said object under examination in first and second directions along said test surface and in a third direction along a depth direction of said object under examination;

image processor means for carrying out, by controlling said scanning means, slant scanning in the third direction during the scanning in either the first or second direction, for generating said display data according to the measured value obtained in either first or second direction in order to display a measurement picture on the screen of said display, and for placing said probe at a position in the third direction where the measured value is collected with respect to an image portion in response to an input signal when the input signal is externally supplied; and input means for feeding, to said image processor means, said input signal for indicating that said image portion has been selected from said measurement picture, said input means being connected to said image processor means.

4. An ultrasonic inspection and imaging instrument as claimed in claim 3, wherein said input means includes a touch-sensitive screen.

5. An ultrasonic inspection and imaging instrument as claimed in claim 3, wherein said input means includes a mouse.

6. An ultrasonic inspection and imaging instrument as claimed in claim 3, wherein said input means includes a keyboard.

7. An ultrasonic inspection and imaging instrument for scanning an object under examination, said object having an interior test surface for detecting an echo peak value emanating from a position corresponding to the focal position obtained from said object under examination by means of a focusing-type probe and for making the echo peak value a measured value, and for generating display data according to said measured value in order to display a measurement picture of said test surface on the screen of a display, said instrument comprising:

scanning means for scanning said object under examination in a first direction along said test surface and in a second direction along a depth direction of said object under examination; and image processor means for carrying out, by controlling said scanning means, scanning in the second direction simultaneously with the first direction to collect said measured value at each of a plurality of measurement points determined by positions in the first and second directions, and for generating said display data for displaying a test picture in conformity with at least the second direction with respect to said measurement point, to display said test picture on the screen of said display for focusing purposes, said image processor means being equipped with a memory for storing relevant information for indicating the relation between a position at which the image is displayed on said test picture and a position in the second direction at which said measured value of the display data has been collected, said image processor means including input means for generating information indicating the position of an image portion when an image portion with respect to said test picture is selected, said image processor means being used to obtain the position in the second direction according to said relevant information and the information showing the position of said image portion from said input means, and to set said ultrasonic probe in position for focusing purposes.

8. An ultrasonic inspection and imaging instrument for scanning an object under examination, said object having an interior test surface for detecting an echo peak value emanating from a position corresponding to the focal position obtained from said object under examination by means of a focusing-type probe and for making the echo peak value a measured value, and for generating display data according to said measured value in order to display a measurement picture of said test surface on the screen of a display, said instrument comprising:

scanning means for scanning said object under examination in first and second directions along said test surface and in a third direction along the depth direction of said object under examination; and image processor means for carrying out, by controlling said scanning means, scanning in the third direction simultaneously with either the first or second direction to collect said measured value at each of a plurality of measurement points determined by positions in the first and second directions, and for generating said display data for displaying a test picture in conformity with the first and second directions with respect to said measurement point to display said test picture on the screen of said display for focusing purposes, said image processor means being equipped with a memory for storing relevant information for indicating the relation between a position at which the image is displayed on said test picture and a position in the third direction at which said measured value of the display data has been collected, said image processor means including input means for generating information indicating the position of an image portion when an image portion with respect to said test picture is selected, said image processor means being used to obtain the position in the third direction according to said relevant information and the information showing the position of said image portion from said input means, and to set said ultrasonic probe in position for focusing purposes.

9. An ultrasonic inspection and imaging instrument as claimed in claim 8, further comprising an A/D converter, wherein said image processor means is provided with a controller and a memory, so that a measured value is subjected by said A/D converter to A/D conversion before being stored in said memory under the control of said controller.

10. An ultrasonic inspection and imaging instrument as claimed in claim 9, wherein said controller is a microprocessor, and wherein measured values stored in said memory are those corresponding to data for identifying the plurality of measurement points, said memory being used as a means for storing the relevant information.

11. An ultrasonic inspection and imaging instrument as claimed in claim 8, wherein said relevant information is for relating the position of the test picture on the screen of said display for focusing purposes to a coordinate position in the third direction about the display data at the former position of the test picture.

12. An ultrasonic inspection and imaging instrument as claimed in claim 8, wherein said input means includes a touch-sensitive screen.

13. An ultrasonic inspection and imaging instrument as claimed in claim 8, wherein said input means includes a mouse.

14. An ultrasonic inspection and imaging instrument as claimed in claim 8, wherein said input means includes a keyboard.

15. An ultrasonic inspection and imaging instrument as claimed in claim 14, wherein said input means includes means for selecting an image portion on the test picture by a cursor key on the keyboard.

16. An ultrasonic inspection and imaging instrument for scanning an object under examination, said object having an interior test surface for detecting an echo peak value emanating from a position corresponding to the focal position obtained from said object under examination by means of a focusing-type probe and for making the echo peak value a measured value, and for generating display data according to said measured value in order to display a measurement picture of said test surface on the screen of a display, said instrument comprising:

scanning means for scanning said object under examination in first and second directions along said test surface and in a third direction along the depth direction of said object under examination; and image processor means for carrying out, by controlling said scanning means, scanning slanted to the third direction during scanning in one direction selected from the first and second directions to collect said measured value at each of a plurality of measurement points determined by positions in the first and second directions, and for generating said display data for displaying a test picture in conformity with the first and second directions with respect to said measurement point to display said picture on the screen of said display for focusing purposes, said image processor means being equipped with a memory for storing relevant information for indicating the relation between a position at which the image is displayed on said test picture and a position in the third direction at which said measured value on the display data has been collected, said image processor means including input means for generating information indicating the position of an image portion when an image portion with respect to said test picture is selected, said image processor means being used to obtain a directional coordinate position selected from positional information from said input means and said relevant information, to obtain the coordinate position of a measurement point in the third direction from the coordinate position previously obtained and to focus said ultrasonic probe onto said coordinate position in the third direction.

17. An ultrasonic inspection and imaging instrument as claimed in claim 6, wherein the scanning means includes control means for scanning in the third direction by moving the focus of said probe.

* * * * *